United States Patent
Hama et al.

(10) Patent No.: US 12,521,718 B2
(45) Date of Patent: Jan. 13, 2026

(54) CONTAINER AND TEST KIT

(71) Applicant: FUJIFILM Corporation, Tokyo (JP)

(72) Inventors: Takeshi Hama, Ashigarakami-gun (JP); Noboru Komori, Ashigarakami-gun (JP); Yuki Inoue, Ashigarakami-gun (JP); Aya Ouchi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1006 days.

(21) Appl. No.: 17/670,721

(22) Filed: Feb. 14, 2022

(65) Prior Publication Data

US 2022/0168741 A1 Jun. 2, 2022

Related U.S. Application Data

(63) Continuation of application No. PCT/JP2020/032201, filed on Aug. 26, 2020.

(30) Foreign Application Priority Data

Sep. 27, 2019 (JP) .................................. 2019-177750

(51) Int. Cl.
  *B01L 3/00* (2006.01)
  *C12Q 1/6806* (2018.01)
  *G01N 33/52* (2006.01)

(52) U.S. Cl.
  CPC ....... *B01L 3/502761* (2013.01); *B01L 3/5023* (2013.01); *C12Q 1/6806* (2013.01);
  (Continued)

(58) Field of Classification Search
  CPC ......... B01L 3/502761; B01L 3/502746; B01L 2200/0668; B01L 2300/0851;
  (Continued)

(56) References Cited

U.S. PATENT DOCUMENTS 6,155,123 A * 12/2000 Bakalyar ................ G01N 30/20
                                                    73/864.22
10,173,217 B2    1/2019 Yamawaki et al.
(Continued)

FOREIGN PATENT DOCUMENTS

CN    107206347 A    9/2017
JP    8-240596 A     9/1996
(Continued)

OTHER PUBLICATIONS

International Preliminary Report on Patentability and English translation of the Written Opinion of the International Searching Authority for International Application No. PCT/JP2020/032201, dated Apr. 7, 2022.
(Continued)

*Primary Examiner* — Jill A Warden
*Assistant Examiner* — Dwayne K Handy
(74) *Attorney, Agent, or Firm* — Birch, Stewart, Kolasch & Birch, LLP

(57) ABSTRACT

In a container including two accommodation parts each accommodating liquid, mixing of the liquids in a case of moving magnetic particles in the liquid accommodated in one accommodation part to the other accommodation part is suppressed. Provided is a container includes a first accommodation part which accommodates a first liquid containing magnetic particles, a second accommodation part which accommodates separated magnetic particles separated from the first liquid, and a second liquid, and a flow passage which allows the first accommodation part and the second accommodation part to communicate with each other, and through which the separated magnetic particles pass, in which the flow passage has a first staircase part including two or more steps from an inner bottom surface of the first accommodation part on a first accommodation part side.

18 Claims, 10 Drawing Sheets

(52) U.S. Cl.
CPC ...... *G01N 33/521* (2013.01); *B01L 2300/069* (2013.01); *B01L 2400/043* (2013.01); *B01L 2400/0644* (2013.01)

(58) Field of Classification Search
CPC . B01L 2400/043; B03C 1/01; B03C 2201/18; G01N 33/54326; G01N 33/5432
See application file for complete search history.

(56) References Cited

U.S. PATENT DOCUMENTS

| | | |
|---|---|---|
| 2004/0224339 A1 | 11/2004 | Numajiri et al. |
| 2007/0072290 A1* | 3/2007 | Hvichia ................. C12M 47/04 |
| | | 435/308.1 |
| 2008/0000833 A1 | 1/2008 | Peters et al. |
| 2008/0031787 A1 | 2/2008 | Yu |
| 2010/0285573 A1* | 11/2010 | Leck ....................... C12M 25/01 |
| | | 435/288.4 |
| 2011/0236277 A1 | 9/2011 | Lee et al. |
| 2011/0240130 A1 | 10/2011 | Den Dulk et al. |
| 2012/0295366 A1 | 11/2012 | Zilch et al. |
| 2013/0302791 A1 | 11/2013 | Cramer et al. |
| 2014/0302529 A1* | 10/2014 | Wimberger-Friedl ........................ |
| | | G01N 1/4077 |
| | | 435/7.23 |
| 2016/0320375 A1 | 11/2016 | Horii et al. |
| 2017/0247682 A1 | 8/2017 | Sakai et al. |
| 2018/0030432 A1 | 2/2018 | Kanai et al. |
| 2019/0302137 A1 | 10/2019 | Segawa et al. |
| 2020/0003691 A1 | 1/2020 | Nagahara et al. |
| 2020/0011861 A1 | 1/2020 | Horii et al. |
| 2020/0025731 A1 | 1/2020 | Asogawa |
| 2020/0263164 A1 | 8/2020 | Sano et al. |
| 2021/0010606 A1 | 1/2021 | Usami et al. |

FOREIGN PATENT DOCUMENTS

| | | |
|---|---|---|
| JP | 2003-279537 A | 10/2003 |
| JP | 2004-340758 A | 12/2004 |
| JP | 2005-204614 A | 8/2005 |
| JP | 2007-101318 A | 4/2007 |
| JP | 2008-209281 A | 9/2008 |
| JP | 2012-512390 A | 5/2012 |
| JP | 2016-211886 A | 12/2016 |
| JP | 2017-153405 A | 9/2017 |
| JP | 2017-158491 A | 9/2017 |
| WO | WO 2018/168819 A1 | 9/2018 |
| WO | WO 2018/181268 A1 | 10/2018 |
| WO | WO 2019/093353 A1 | 5/2019 |
| WO | WO 2019/187294 A1 | 10/2019 |
| WO | WO 2019/189753 A1 | 10/2019 |

OTHER PUBLICATIONS

International Search Report for International Application No. PCT/JP2020/032201, dated Nov. 2, 2020, with English translation.
Extended European Search Report for corresponding European Application No. 20868048.8, dated Nov. 2, 2022.
Chinese Office Action and Search Report for corresponding Chinese Application No. 202080061430.8, dated Sep. 28, 2023, with English translation.
Japanese Notice of Reasons for Refusal for Japanese Application No. 2021-548442, dated Oct. 18, 2022, with an English translation.

* cited by examiner

CONTAINER AND TEST KIT

CROSS-REFERENCE TO RELATED APPLICATIONS

This application is a Continuation of PCT International Application No. PCT/JP2020/032201 filed on Aug. 26, 2020, which claims priority under 35 U.S.C § 119(a) to Japanese Patent Application No. 2019-177750 filed on Sep. 27, 2019. Each of the above application(s) is hereby expressly incorporated by reference, in its entirety, into the present application.

BACKGROUND OF THE INVENTION

1. Field of the Invention

The technology of the present disclosure relates to a container and a test kit.

2. Description of the Related Art

JP2012-512390A discloses a configuration in that, a microfluidic device includes two hydrophilic regions separated from each other by a hydrophobic region in a flow passage, the two hydrophilic regions separately hold liquids different from each other, a magnetic actuator is moved to a hydrophobic position from one hydrophilic region, to move magnetic particles in the liquid of the one hydrophilic region to the hydrophobic region, thereby operating the magnetic particles as a valve for controlling the connection of the liquid between the two hydrophilic regions.

JP2005-204614A discloses a configuration in that, in a biochemical reaction cartridge including a plurality of accommodation parts and a flow passage connecting these, an electromagnet is disposed on a flow passage, a liquid containing magnetic particles is allowed to flow to capture the magnetic particles by the electromagnet, then, the electromagnet is turned off to allow another liquid to flow, and the magnetic particles are moved together with the liquid to a desired accommodation part.

SUMMARY OF THE INVENTION

In JP2012-512390A, by moving the magnetic particles in the liquid of the one hydrophilic particles to the hydrophobic region, the liquid provided in each of the two hydrophilic regions is connected, so that the liquid is mixed.

In JP2005-204614A, the liquid containing the magnetic particles is reciprocated the two accommodation parts through the flow passage connecting the accommodation parts to promote the capture of the magnetic particles in the electromagnet, but in a plurality of steps, different kinds of liquids flow in and out of the same flow passage, and accordingly, a liquid used in a previous process may be mixed with a liquid of a subsequent process. In addition, since two or more accommodation parts are required for each step, the number of accommodation parts increases and the configuration becomes complicated.

In consideration of the above circumstances, an object of the disclosed technology is to provide a container including two accommodation parts and capable of suppressing mixing of liquids in a case of moving magnetic particles in a liquid accommodated in one accommodation part to another accommodation part, and a test kit.

According to the present disclosure, there is provided a container comprising a first accommodation part which accommodates a first liquid containing magnetic particles,
a second accommodation part which accommodates separated magnetic particles separated from the first liquid, and a second liquid, and
a flow passage which allows the first accommodation part and the second accommodation part to communicate with each other, and through which the separated magnetic particles pass,
in which the flow passage has a first staircase part including two or more steps from an inner bottom surface of the first accommodation part on a first accommodation part side.

In the container of the present disclosure, it is preferable that the flow passage allows the first accommodation part and the second accommodation part to communicate with each other at upper end positions thereof.

In the container of the present disclosure, it is preferable that a height of a first step of the first staircase part with respect to the inner bottom surface of the first accommodation part is 25% to 80% of a height of the first accommodation part.

In the container of the present disclosure, it is preferable that a height of a second step of the first staircase part with respect to the inner bottom surface of the first accommodation part is 50% to 96% of a height of the first accommodation part.

In the container of the present disclosure, it is preferable that a water contact angle of at least a part of an inner surface of the first accommodation part is smaller than a water contact angle of at least a part of an inner surface of the flow passage.

In this case, it is preferable that the water contact angle of at least a part of the inner surface of the flow passage is 90° to 180°. In addition, it is preferable that the water contact angle of the inner surface of the flow passage is 120° to 180°.

Alternatively, it is preferable that the water contact angle of at least a part of the inner surface of the first accommodation part is 0° to 60°. In addition, it is preferable that the water contact angle of at least a part of the inner surface of the first accommodation part is 0° to 30°.

In the container of the present disclosure, it is preferable that an angle of at least one step of the first staircase part is an acute angle in a cross section parallel to an extending direction of the flow passage and parallel to a direction perpendicular to the flow passage.

In the container of the present disclosure, the flow passage may have a second staircase part including two or more steps from an inner bottom surface of the second accommodation part on a second accommodation part side.

In the container of the present disclosure, the magnetic particles can be magnetic particles that adsorb nucleic acid.

The container of the present disclosure may further include a chromatographic carrier for performing a test of the nucleic acid, and a carrier accommodation part for accommodating the chromatographic carrier.

A test kit of the present disclosure includes the container of the present disclosure, and magnetic particles.

It is preferable that the test kit of the present disclosure further includes a nucleic acid extraction liquid, a cleaning liquid, and at least one solution of an amplification liquid or a detection pretreatment liquid.

According to the disclosed technology, it is possible to suppress the mixing of liquids in a case where the magnetic particles in the liquid accommodated in one accommodation part are moved to the other accommodation part.

DESCRIPTION OF THE PREFERRED EMBODIMENTS

Hereinafter, an example of an embodiment according to the present invention will be described with reference to the drawings. A front direction, a rear direction, an upward direction, a downward direction, a left direction, and a right direction used in the description below correspond to "FR", "RR", "UP", "DO", "LH", and "RH", respectively, in each drawing. Since these directions are defined for convenience of description, a device configuration is not limited to these directions. The FR side is an upstream side and the RR side is a downstream side in the use of a container.

(Separation Device 15)

Figure 1:
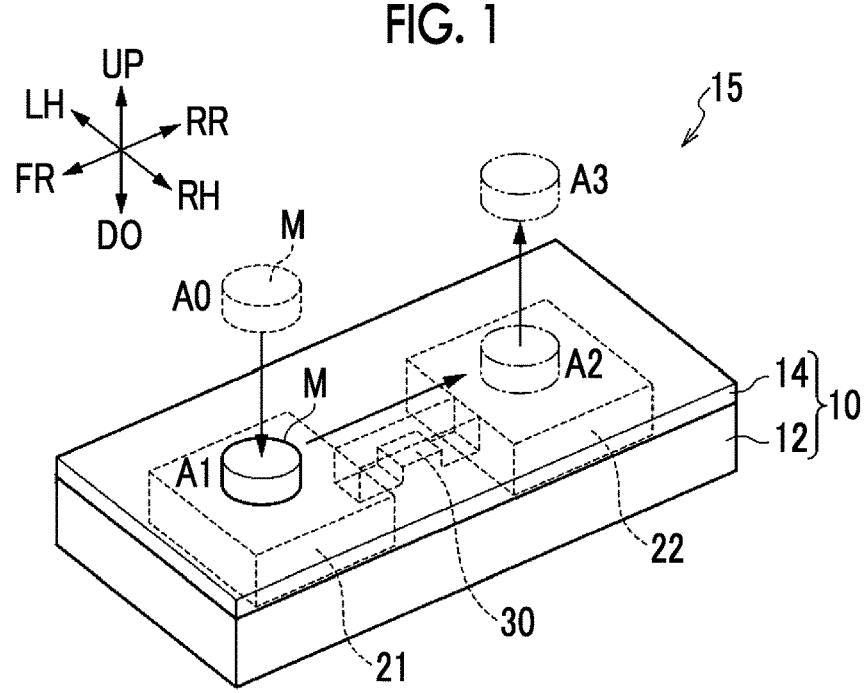
FIG. 1 is a perspective view showing a schematic configuration of a separation device 15.

First, a separation device 15 formed of a container 10 according to a first embodiment will be described. FIG. 1 is a perspective view showing a schematic configuration of the separation device 15.

Figure 5:
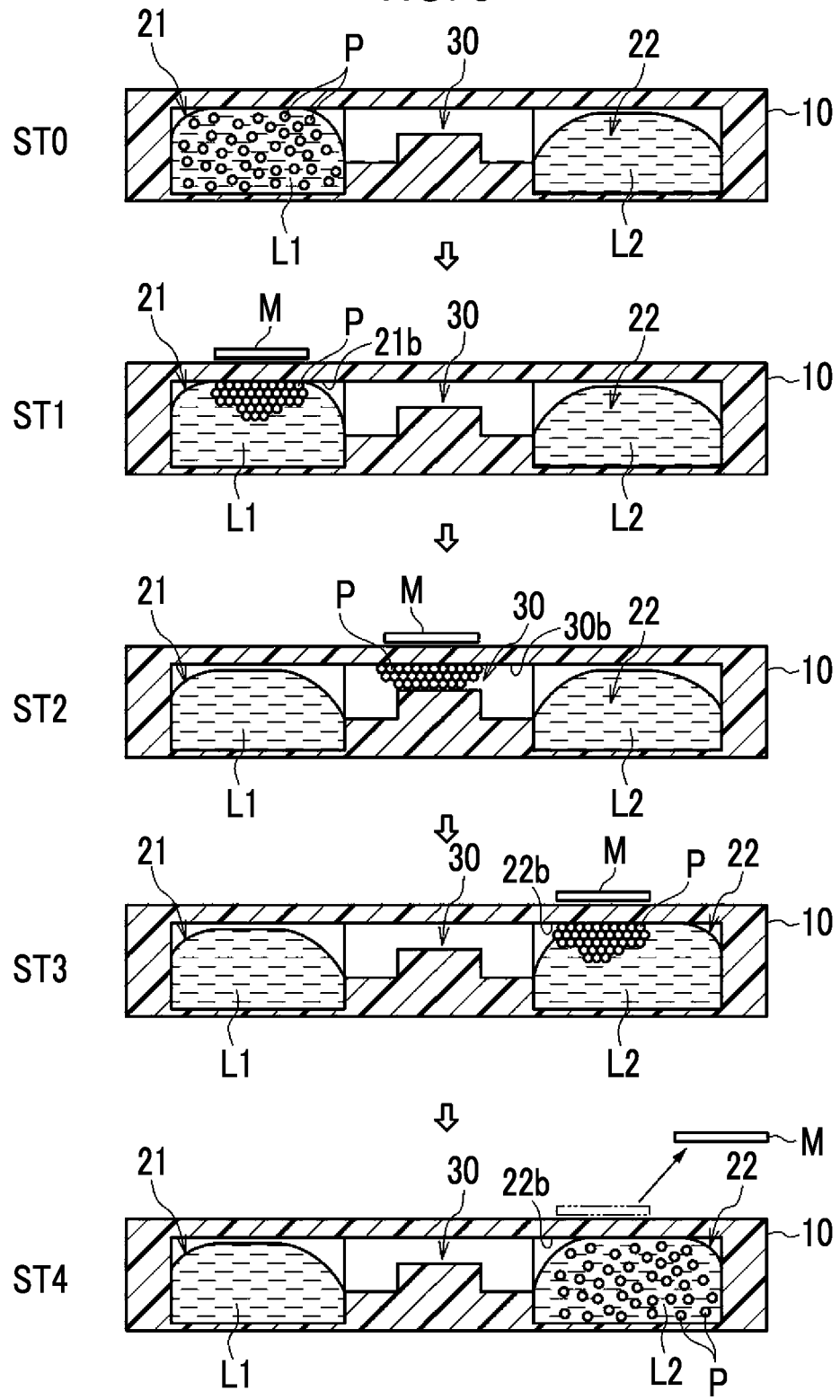
FIG. 5 is a step diagram of the separation method.

The separation device 15 shown in FIG. 1 is a device which separates magnetic particles P from a liquid L1 containing the magnetic particles P (see FIG. 5). Specifically, the separation device 15 includes the container 10 according to the present embodiment, and a magnetic field generation moving unit including a magnet M and a moving mechanism (not shown) for moving the magnet M.

(Container 10)

Figure 2:
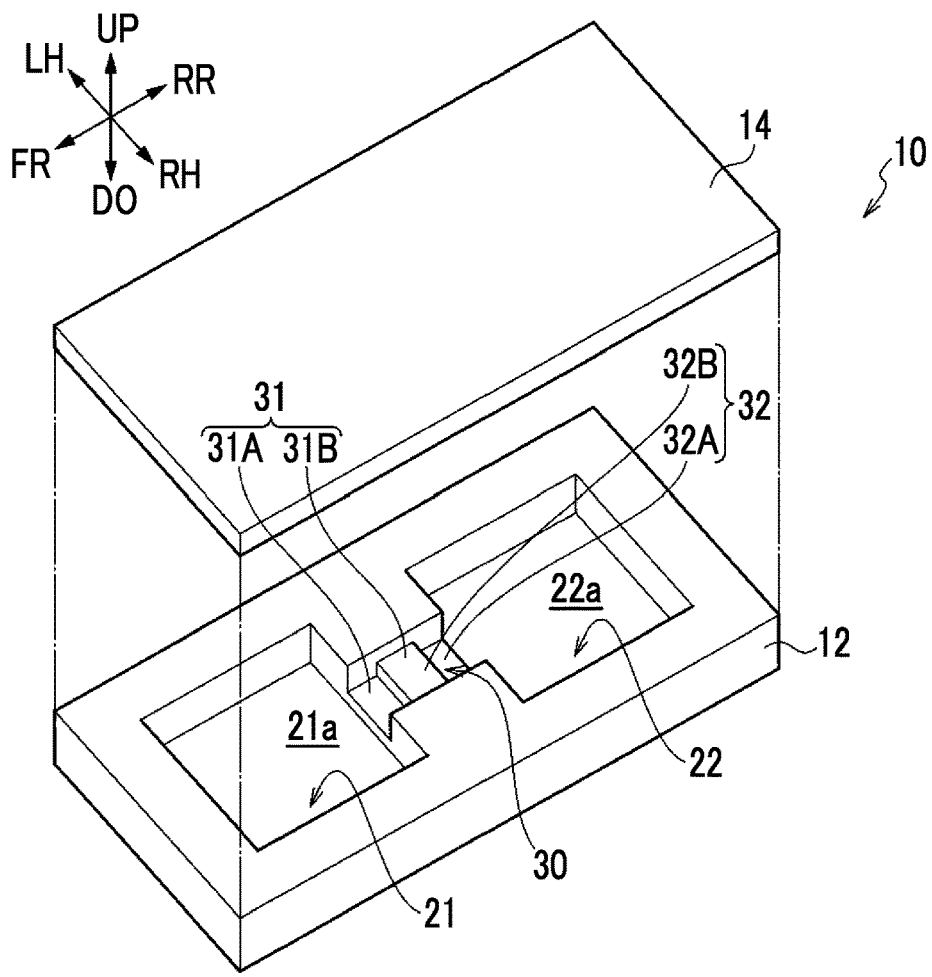
FIG. 2 is an exploded perspective view showing a schematic configuration of a container 10.
Figure 3:
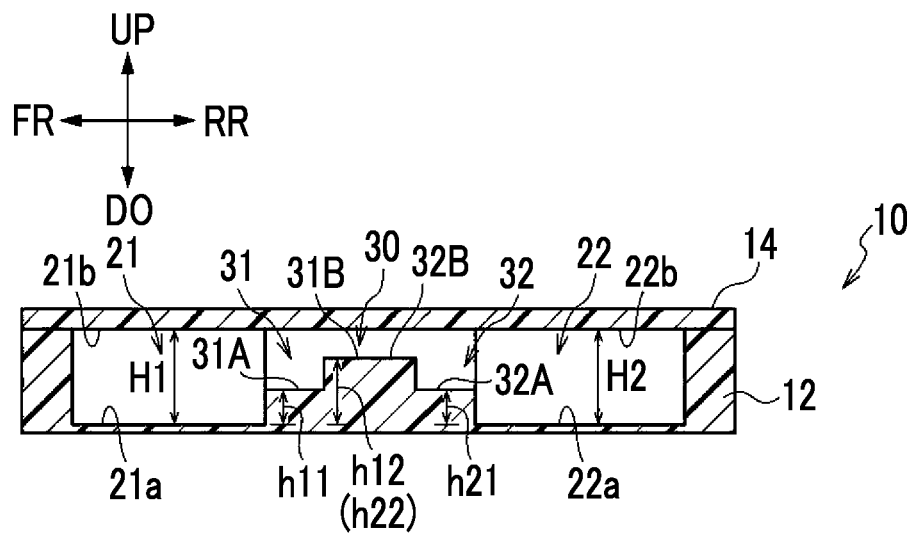
FIG. 3 is a cross-sectional view showing a schematic configuration of the container 10.
Figure 4:
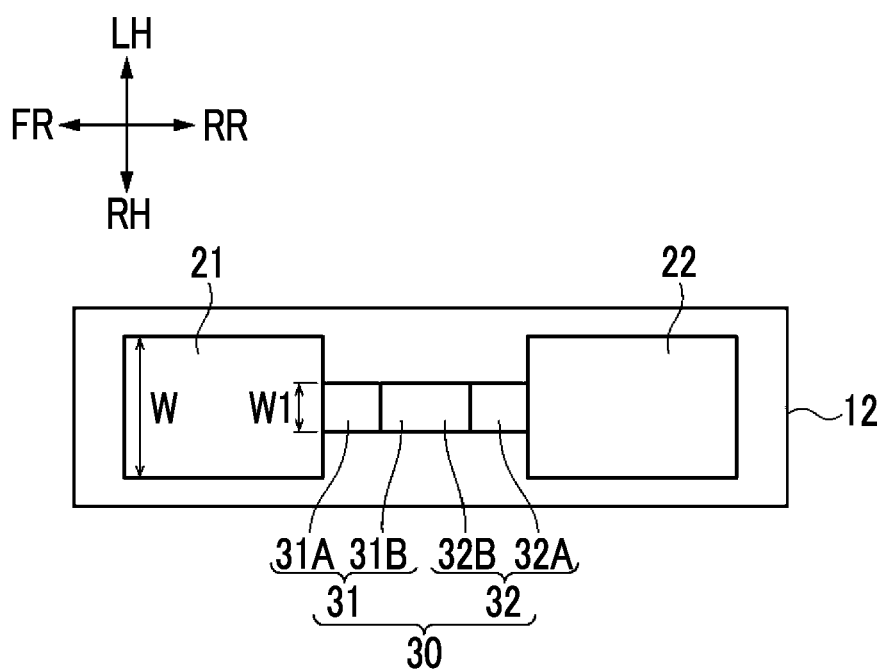
FIG. 4 is a plan view showing a schematic configuration of a body part 12 of the container 10.

A container 10 according to the present embodiment will be described. FIG. 2 is an exploded perspective view showing a schematic configuration of the container 10. FIG. 3 is a cross-sectional view showing a schematic configuration of the container 10. FIG. 4 is a plan view showing a schematic configuration of a body part 12 of the container 10.

The container 10 shown in FIGS. 2, 3, and 4 includes a first accommodation part 21 which accommodates the first liquid L1 containing the magnetic particles P, a second accommodation part 22 which accommodates the magnetic particles (separated magnetic particles) P separated from the first liquid L1 and a second liquid L2, and a flow passage 30 which allows the first accommodation part 21 and the second accommodation part 22 to communicate with each other at upper end positions thereof. The flow passage 30 includes a first staircase part 31 having two steps from an inner bottom surface 21a of the first accommodation part 21 on a side of the first accommodation part 21. In this example, the flow passage 30 also includes a second staircase part 32 having two steps from an inner bottom surface 22a of the second accommodation part 22 on a side of the second accommodation part 22. Here, the first staircase part 31 and the second staircase part 32 are a part of the flow passage 30. The first staircase part 31 is provided in a region adjacent to the first accommodation part 21 of the flow passage 30, and the second staircase part 32 is provided in a region adjacent to the second accommodation part 22 of the flow passage 30.

The container 10 includes a body part 12 constituting a side wall and a bottom surface of each of the first accommodation part 21, the second accommodation part 22, and the flow passage 30, and an upper surface member 14 installed to cover openings of the first accommodation part 21, the second accommodation part 22, and the flow passage 30 of the body part 12 and constituting upper surfaces 21b and 22b, and 30b of the first accommodation part 21, the second accommodation part 22, and the flow passage 30. Dispensing ports for dispensing a liquid may be provided in regions corresponding to the upper surfaces 21b and 22b of the first accommodation part 21 and the second accommodation part 22 of the upper surface member 14. The upper surface member 14 may be provided with no dispensing port, and the upper surface member 14 may be covered and adhered to an upper surface of the body part 12 after adding the first liquid L1 and the second liquid L2 to each of the accommodation parts 21 and 22.

The flow passage 30 is a flow passage through which the magnetic particles P separated from the first liquid L1 pass. In this example, the upper surface 30b of the flow passage 30 is flush with the upper surface 21b of the first accommodation part 21 and the upper surface 22b of the second accommodation part 22, and the flow passage 30 allows the first accommodation part 21 and the second accommodation part 22 to communicate with each other at the upper end position. However, the arrangement of the flow passages 30 is not limited to this configuration. For example, the flow passage 30 may be provided at a portion slightly lower than the upper end position of the first accommodation part 21 and the second accommodation part 22.

In this example, the flow passage 30 has a width W1 narrower than a width W of the first accommodation part 21 and the second accommodation part 22. The width W1 of the flow passage 30 may be equal to the width W of the first accommodation part 21 and the second accommodation part 22, but is preferably narrower than the width of the first accommodation part 21 and the second accommodation part 22. The width W1 of the flow passage 30 is preferably ½ or less and more preferably ⅓ or less of the width W of the first accommodation part 21.

The first staircase part 31 of the flow passage 30 includes a first step 31A on the first accommodation part 21 side and a second step 31B. The first staircase part 31 is not limited to two steps and may have three steps or four or more steps. However, from a viewpoint of avoiding complication of the structure, the first staircase part preferably has two or three steps.

A height h11 of the first step 31A is preferably 25% to 80%, more preferably 30% to 80%, and even more preferably 50% to 80% of H1, where a height (depth) from the inner bottom surface 21a to the upper surface 21b of the first accommodation part 21 is defined as H1.

A height h12 of the second step 31B is preferably 50% to 96%, more preferably 60% to 96%, and even more preferably 80% to 96% of the height H1 of the first accommodation part 21. A difference between the height h12 of the second step 31B and the height h11 of the first step 31A is preferably 20% or more of the height h11 of the first step 31A.

The second staircase part 32 of the flow passage 30 includes a first step 32A on the second accommodation part 22 side and a second step 32B. The second staircase part 32 is not limited to two steps and may have three steps or four or more steps. However, from a viewpoint of avoiding complication of the structure, the second staircase part preferably has two or three steps.

The height h21 of the first step 32A is preferably 25% or more, more preferably 30% or more, and even more preferably 50% or more of H2, where a height (depth) from the inner bottom surface 22a to the upper surface 22b of the second accommodation part 22 is defined as H2.

A height h22 of the second step 32B is preferably 50% or more, more preferably 60% or more, and even more preferably 80% or more of the height H2 of the second accommodation part 22. A difference between the height h22 of the second step 32B and the height h21 of the first step 32A is preferably 20% or more of the height h21 of the first step 32A, from a viewpoint of preventing the liquid sealing.

In this example, the height H1 of the first accommodation part 21 and the height H2 of the second accommodation part 22 are the same, and the first staircase part 31 and the second staircase part 32 of the flow passage 30 have a symmetrical shape with respect to a center in a flow direction of the flow passage 30. Accordingly, the height h11 of the first step 31A of the first staircase part 31 and the height h21 of the first step 32A of the second staircase part 32 are the same, and the second step 31B of the first staircase part 31 and the second step 32B of the second staircase part 32 are the common step. The height of the first accommodation part 21 may not be the same as that of the second accommodation part 22 and the height of the first step of the first staircase part 31 may not be the same as that of the second staircase part 32, either. In addition, at least the first staircase part 31 may have two or more steps, and the second staircase part 32 may have only one step.

As the material of the container 10, that is, the body part 12 and the upper surface member 14, any known resin-molded plastic materials can be used without particular limitation. Examples thereof include an acrylic resin such as a polymethyl methacrylate resin (PMMA), a polyolefin resin such as a polycarbonate resin, polyethylene (PE), polypropylene (PP), a cycloolefin resin such as a cycloolefin polymer (COP) and a cyclic olefin copolymer (COC), a silicone resin, a fluororesin, a polystyrene resin, a polyvinyl chloride resin, a phenol resin, a urethane resin, a polyester resin, an epoxy resin, and a cellulose resin. Particularly, from viewpoints of heat resistance and transparency, a polycarbonate resin, polypropylene, a cycloolefin resin, a silicone resin, and a fluororesin are preferable.

A size (volume) of the first accommodation part 21 and the second accommodation part 22 is, for example, approximately 1 μL (microliter) to several hundreds μL.

(Magnet M)

The magnet M is, for example, a permanent magnet, but may be an electromagnet. As shown in FIG. 1, the magnet M is freely moved between positions A0, A1, A2, and A3 of the upper surface member 14 of the container 10. The positions A0 and A3 are positions where a magnetic force does not act on the magnetic particles P accommodated in the container 10, even in a case where the magnet M is disposed. The position A1 is a position on the first accommodation part 21 and is a position where magnetic force acts on the magnetic particles in the first accommodation part 21 in a case where the magnet M is disposed. The position A2 is a position on the second accommodation part 22 and is a position where magnetic force acts on the magnetic particles in the second accommodation part 22 in a case where the magnet M is disposed. In a case where the magnet M is positioned at the position A1, the magnetic particles P accommodated in the first accommodation part 21 are collected by the magnetic force of the magnet M and are attracted and collected at the position corresponding to the magnet M with the upper surface member 14 interposed therebetween. In the same manner, in a case where the magnet M is positioned at the position A2, the magnetic particles accommodated in the second accommodation part 22 are attracted and collected at the position corresponding to the magnet M with the upper surface member 14 interposed therebetween.

(First Liquid L1, Second Liquid L2, and Magnetic Particles P)

A desired treatment solution can be appropriately selected for each of the first liquid L1 and the second liquid L2. The treatment solution is a solution for performing some kind of treatment for a sample. The second liquid L2 is, for example, a treatment solution having characteristics different from those of the first liquid L1 and is a treatment solution used in a step after the treatment with the first liquid L1.

As the first liquid L1, for example, a treatment solution containing an adsorbent having an adsorbing action on the magnetic particles P is used. As the first liquid L1, for example, a sample liquid containing a sample as an adsorbent is used. More specifically, as the first liquid L1, for example, a sample liquid containing nucleic acid released from cells as a sample is used.

Examples of the second liquid L2 include a cleaning liquid for removing a substance non-specifically adsorbed on the magnetic particles P, a deoxyribonucleic acid (DNA) amplification liquid, a detection pretreatment liquid, and the like.

The magnetic particles P are particles that are attracted by magnetic force. The magnetic particles P are, for example, magnetic particles treated so as to adsorb a specific sample such as DNA. Specifically, as the magnetic particles P, model number: Magnosphere MX100/Carboxyl and model number: Magnosphere MS160/Tosyl manufactured by JSR Corporation, sicastar manufactured by Corefront, Magrapid manufactured by Sanyo Chemical Industries, Ltd. can be used.

As the magnetic particles P, magnetic particles having a particle size in a range of 0.01 μm to 100 μm are used. As the magnetic particles P, magnetic particles having a particle size of approximately 1 μm to 10 μm are preferably used. The magnetic particles P may be included in the first accommodation part 21 of the container 10, or may be injected into the first accommodation part 21 together with the first liquid L1.

The liquid L1 may include a surfactant for extracting a nucleic acid such as DNA from the sample and adsorbing the nucleic acid on the surface of the magnetic particles P. As the surfactant, for example, sodium dodecyl sulfate, polyoxyethylene sorbitan monolaurate (Tween 20), Triton X-100, or the like can be used. These surfactants may be used alone or in combination of a plurality thereof. A chaotropic substance such as guanidine hydrochloride may be included in order to promote extraction of nucleic acid from the sample and surface adsorption to the magnetic particles P.

In addition, instead of containing the surfactant, a nucleic acid extracted from a sample using a column may be contained.

In addition, a surfactant for suppressing aggregation of the magnetic particles P may be included.

(Separation Method)

Next, the separation method for separating the magnetic particles P from the first liquid L1 containing the magnetic particles P in the first accommodation part 21 by using the separation device 15 and accommodating the magnetic particles P in the second accommodation part 22 will be described with reference to FIG. 5. FIG. 5 is a step diagram of the separation method.

First, the first liquid L1 containing the magnetic particles P is accommodated in the first accommodation part 21 of the container 10. In addition, the second liquid L2 is accommodated in the second accommodation part 22 (see ST0).

Next, the magnet M is set at the position A1 on the first accommodation part 21 of the container 10. Accordingly, the magnetic particles P accommodated in the first accommodation part 21 is attracted to the magnet M and collected and aggregated at a position corresponding to the magnet M on the upper surface 21b (see ST1).

In a case where the magnet M is moved to a downstream RR side and moved onto the flow passage 30, the magnetic particles P move along the upper surface 21b of the first accommodation part along with the movement of the magnet M, and are separated from the first liquid L1, enter the flow passage 30, and move to a position corresponding to the magnet M on the upper surface 30b of the flow passage (see ST2).

In addition, in a case where the magnet M is moved to the downstream RR side and moved to the position A2 on the second accommodation part 22, the magnetic particles P move along with the movement of the magnet M, enter the second accommodation part 22, and are mixed in the liquid L2 (see ST3). However, since the magnet M is positioned at the position A2, the magnetic particles P are aggregated at a position corresponding to the magnet M on the upper surface 22b of the second accommodation part.

After that, in a case where the magnet M is moved to the position A3 where the magnetic force does not act on the magnetic particles P in the second accommodation part 22, the magnetic particles P fall from the upper surface 22b of the second accommodation part into the second liquid L2, dispersed in the second liquid L2, and accommodated in the second accommodation part 22 together with the second liquid L2 (see ST4 in FIG. 4).

(Specific Usage Example of the Separation Device 15)

The separation device 15 can be used in a nucleic acid extraction test including treatment of the polymerase chain reaction (PCR). For example, in a case where nucleic acids such as ribonucleic acid (RNA) and DNA released from cells are adsorbed on magnetic particles and the magnetic particles on which the nucleic acid is adsorbed are separated from the mixed liquid in which the nucleic acid is mixed, the separation device 15 can be used.

(Action Effect of this Embodiment)

According to the present embodiment, since the flow passage 30 of the container 10 includes the first staircase part 31 including two or more steps on the first accommodation part 21 side, a barrier of entry of the first liquid L1 accommodated in the first accommodation part 21 to the flow passage 30 contains two or more steps, and accordingly, it is possible to effectively suppress the flow to the second accommodation part 22 through the flow passage 30, compared to a case where the step is only one. In a case of moving the magnetic particles P in the first liquid L1 accommodated in the first accommodation part 21 to the second accommodation part 22 through the flow passage 30, the liquid exhaustion in a case of separating the magnetic particles P from the first liquid L1 is improved by including the first staircase part 31, and the mixing of the first liquid L1 into the second liquid L2 accommodated in the second accommodation part 22 can be sufficiently suppressed. For example, in a case where the magnetic particles P and the second liquid L2 accommodated in the second accommodation part 22 are provided for the test and the first liquid L1 which is a treatment solution of previous step is mixed with the second liquid L2 which is a treatment solution of a subsequent step, there is a risk that a test accuracy decreases. However, by using this container 10, it is possible to suppress the mixing of the first liquid L1 into the second liquid L2, accordingly the test can be performed with a high accuracy.

In a case where the flow passage 30 of the container 10 includes a second staircase part 32 including two or more steps on the second accommodation part 22 side, the movement of the second liquid L2 accommodated in the second accommodation part 22 to the first accommodation part 21 side can be suppressed, and accordingly, it is possible to effectively suppress the mixing of the first liquid L1 with the second liquid L2.

In the container 10 of the embodiment, from a viewpoint of suppressing the entry of the first liquid L1 to the flow passage 30, a contact angle (water contact angle) of an inner surface of the flow passage 30 with respect to water is preferably 90° to 180°, more preferably 120° to 180°, and even more preferably 150° to 180°. By performing a hydrophobic treatment with respect to the inner surface of the flow passage 30, the water contact angle of the inner surface of the flow passage 30 can be set to 90° or more. In a case where the water contact angle of the inner surface of the flow passage 30 is 90° or more, the water contact angles of the inner surfaces of the first accommodation part 21 and the second accommodation part 22 may be the same as the water contact angle of the inner surface of the flow passage 30, but is preferably smaller than the water contact angle of the inner surface of the flow passage 30. Here, "°" represents a "degree" which is a unit of angle.

In the present specification, the water contact angle is a contact angle of pure water. Specifically, 1 µL of pure water is added dropwise to the inner surface of the flow passage and the accommodation part under the condition of an atmosphere temperature of 25° C., the contact angle is measured by the θ/2 method using a fully-automatic contact angle meter (model number: DM-701, Kyowa Interface Science Co., Ltd.), and an arithmetic mean value of values obtained by measuring 5 times is used.

Modification Example 1

Figure 6:
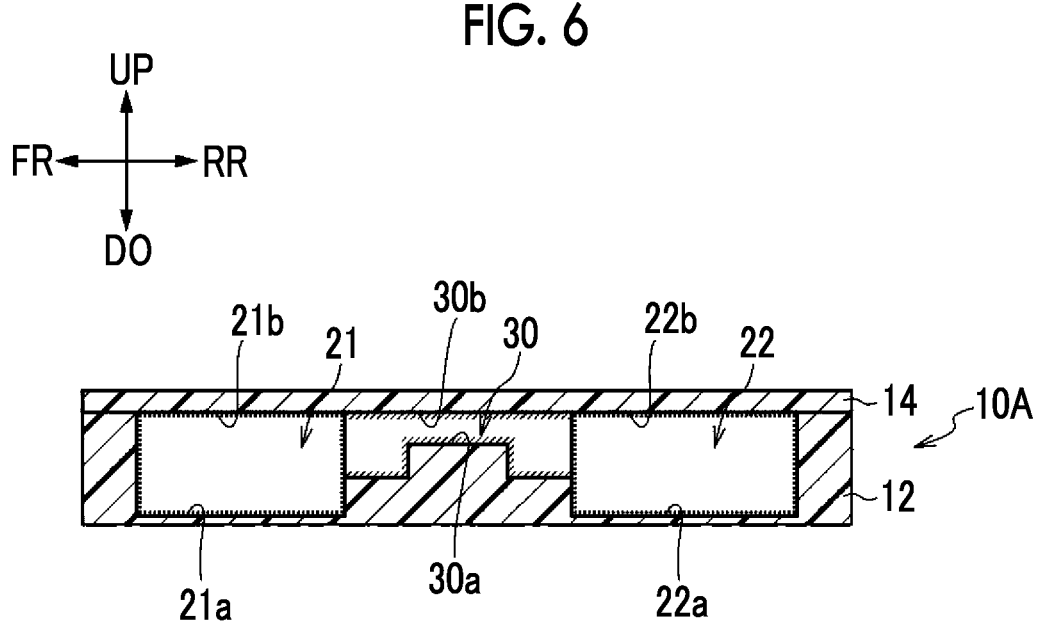
FIG. 6 is a cross-sectional view of a container 10A of Modification Example 1.
Figure 7:
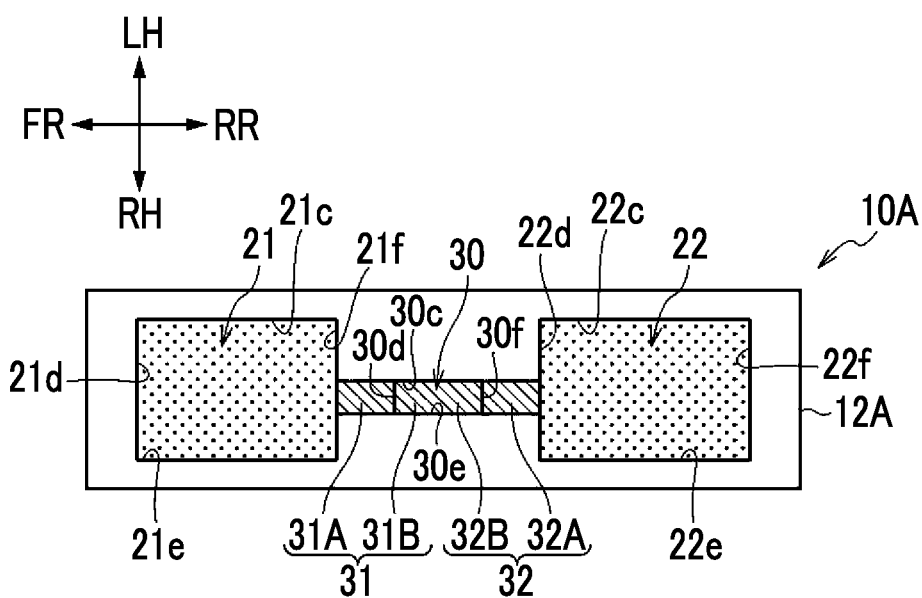
FIG. 7 is a plan view of a body part 12A of the container 10A of Modification Example 1.

FIG. 6 is a cross-sectional view of a container 10A of Modification Example 1, and FIG. 7 is a plan view of a body part 12A of the container 10A of Modification Example 1.

In the container 10A of the modification example, the inner surface of the container 10 of the above embodiment is surface-treated so that the water contact angle of the inner surface of the first accommodation part 21 is smaller than the water contact angle of the inner surface of the flow passage 30. In addition, the surface treatment of the inner surface is performed so that the water contact angle of the inner surface of the second accommodation part 22 is smaller than the water contact angle of the inner surface of the flow passage 30.

The first accommodation part 21 is configured with the bottom surface 21a, the upper surface 21b, an LH side wall surface 21c, an FR side wall surface 21d, an RH side wall surface 21e, and an RR side wall surface 21f, and these surfaces 21a to 21f are inner surfaces of the first accommodation parts 21. The second accommodation part 22 is configured with the bottom surface 22a, the upper surface 22b, an LH side wall surface 22c, an FR side wall surface 22d, an RH side wall surface 22e, and an RR side wall surface 22f, and these surfaces 22a to 22f are inner surfaces of the second accommodation parts 22. In addition, the flow passage 30 is configured with a bottom surface 30a, an upper surface 30b, an LH side wall surface 30c, an FR side wall surface 30d, an RH side wall surface 30e, and an RR side wall surface 30f, and these surfaces 30a to 30f are inner surfaces of the flow passage 30.

In FIGS. 6 and 7, regions of the inner surfaces of the first accommodation part 21 and the second accommodation part 22 that have been subjected to the hydrophilic treatment are indicated by dots. In addition, the region on the inner surface of the flow passage 30 that has been subjected to the hydrophobic treatment is indicated by diagonal lines.

In the container 10A of the modification example, since the water contact angle of the inner surface of the first accommodation part 21 is smaller than the water contact angle of the inner surface of the flow passage 30, it is possible to further suppress the entry of the first liquid L1 accommodated in the first accommodation part 21 into the flow passage 30. A higher effect can be obtained together with the effect of suppressing the entry of the first liquid L1 into the flow passage 30 by the first staircase part 31.

In the same manner, since the water contact angle of the inner surface of the second accommodation part 22 is smaller than the water contact angle of the inner surface of the flow passage 30, it is possible to further suppress the entry of the second liquid L2 accommodated in the second accommodation part 22 into the flow passage 30. A higher effect can be obtained together with the effect of suppressing the entry of the second liquid L2 into the flow passage 30 by the second staircase part 32.

The surface treatment such as the hydrophilic treatment or the hydrophobic treatment is preferably formed on the entire inner surface, but a part of the inner surface may not be treated. It is preferable that at least a region adjacent to a boundary between the first accommodation part 21 and the flow passage 30 and a region adjacent to a boundary between the second accommodation part and the flow passage 30 are surface-treated.

Examples of the hydrophilic treatment include a surface modification treatment such as a corona treatment, a plasma treatment, an ozone treatment, a treatment of applying a hydrophilic coating agent, and bonding of a hydrophilic film. Examples of the hydrophobic treatment include a treatment of applying a hydrophobic coating agent, a silane coupling treatment, and bonding of a water-repellent film.

The water contact angle of the inner surface of the flow passage 30 is preferably 90° or more, more preferably 120° or more, and particularly preferably 150° or more. By increasing the water contact angle of the inner surface of the flow passage 30, it is possible to improve the effect of suppressing the entry of liquid into the flow passage 30 from the first accommodation part 21 side. In this case, the water contact angle of the inner surface of the first accommodation part 21 may be smaller than the water contact angle of the inner surface of the flow passage 30.

Alternatively, the water contact angle of the first accommodation part 21 is preferably 0° to 60° and more preferably 0° to 30°. In this case, the water contact angle of the inner surface of the flow passage 30 may be larger than the water contact angle of the inner surface of the first accommodation part 21, and the water contact angle of the inner surface of the flow passage 30 is preferably 80° or more, more preferably 90° or more, and even more preferably 120° or more.

In the same manner as the first accommodation part 21, the water contact angle of the second accommodation part 22 is preferably 0° to 60° and more preferably 0° to 30°.

A difference between the water contact angle of the inner surface of the flow passage 30 and the water contact angle of the inner surface of the first accommodation part 21 is preferably 10° or more, more preferably 20° or more, even more preferably 40° or more, and particularly preferably 60° or more. In the same manner, a difference between the water contact angle of the inner surface of the flow passage 30 and the water contact angle of the inner surface of the second accommodation part 22 is preferably 10° or more, more preferably 20° or more, even more preferably 40° or more, and particularly preferably 60° or more.

In this example, since the first accommodation part 21, the second accommodation part 22, and the flow passage 30 are integrally formed, the inner surfaces of the first accommodation part 21, the second accommodation part 22, and the flow passage 30 have the same water contact angle in a state where the surface treatment is not performed. In the container 10A of the modification example 1, in order to make the water contact angle of the inner surface of the flow passage 30 greater than the water contact angle of the inner surfaces of the first accommodation part 21 and the second accommodation part 22, the flow passage 30 is subjected to the hydrophobic treatment and the first accommodation part 21 and the second accommodation part 22 are subjected to the hydrophilic treatment. However, in a case where the inner surface of the flow passage 30 is subjected to the hydrophobic treatment to increase the water contact angle to be greater than that of the inner surface which is not surface-treated, the inner surfaces of the first accommodation part 21 and the second accommodation part 22 may not be surface-treated. Alternatively, in a case where the inner surfaces of the first accommodation part 21 and the second accommodation part 22 are subjected to the hydrophilic treatment to decrease the water contact angle to be smaller than the inner surface which is not surface-treated, the inner surface of the flow passage 30 may not be surface-treated.

Modification Example 2

Figure 8:
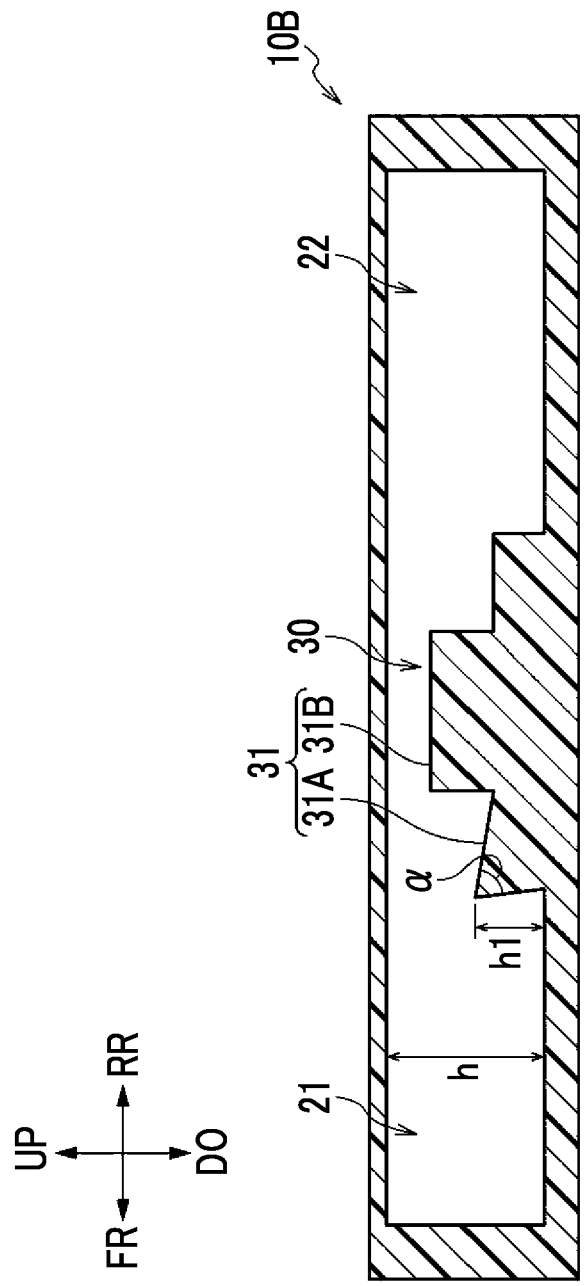
FIG. 8 is a cross-sectional view of a container 10B of Modification Example 2.

In the container 10 of the above embodiment, the angles of the steps 31A and 31B of the first staircase part 31 and the angles of the steps 32A and 32B of the second staircase part 32 are right angles in the cross-sectional view of FIG. 2, but an angle α of the angle of the step 31A in the cross-sectional view may be an acute angle as in the container 10B of the modification example shown in FIG. 8. The angle of the corner of the step is defined as an angle in the cross section parallel to an extending direction of the flow passage (FR-RR) and parallel to a direction perpendicular to the flow passage (UP-DW). By making the angle of the corner of the step an acute angle, it is possible to more effectively suppress the entry of the first liquid accommodated in the first accommodation part 21 into the flow passage, and the sealing property of the liquid is improved.

In a modification example 2 shown in FIG. 8, only the angle of the step 31A of the first staircase part 31 is an acute angle, but corners of all of the steps 31A, 31B, 32A, and 32B included in the flow passage 30 may have acute angles.

In a case where at least one corner of the steps 31A or 31B of the first staircase part 31 has an acute angle, the effect of suppressing the entry of the first liquid L1 from the first accommodation part 21 into the flow passage 30 is increased. In a case where at least one corner of the steps 32A or 32B of the second staircase part 32 has an acute angle, the effect of suppressing the entry of the second liquid L2 from the second accommodation part 22 into the flow passage 30 is increased.

(Application Example to Nucleic Acid Extraction Test)

Figure 9:
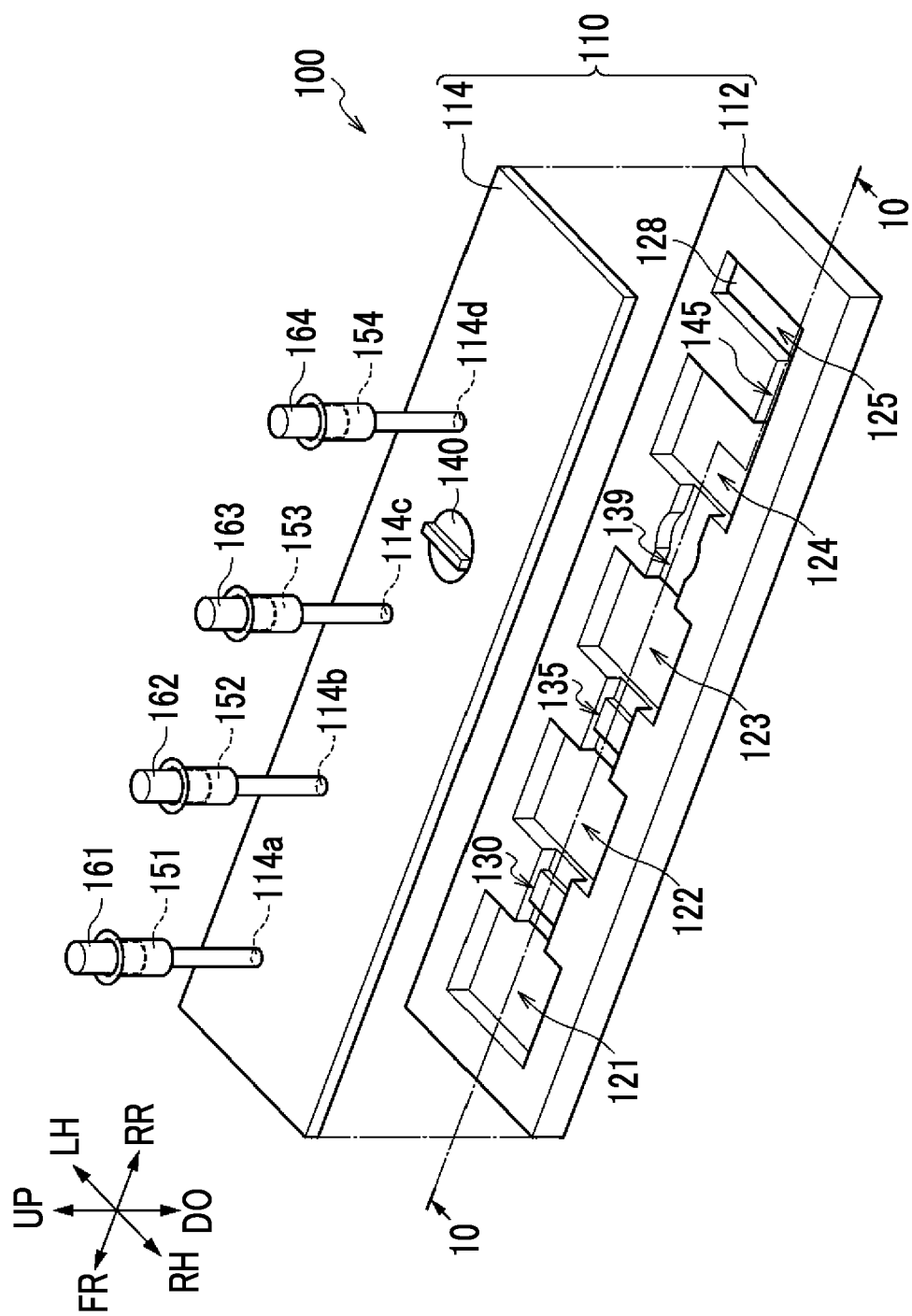
FIG. 9 is a perspective view showing a part of a nucleic acid extraction test apparatus 100 including a container 110.
Figure 10:
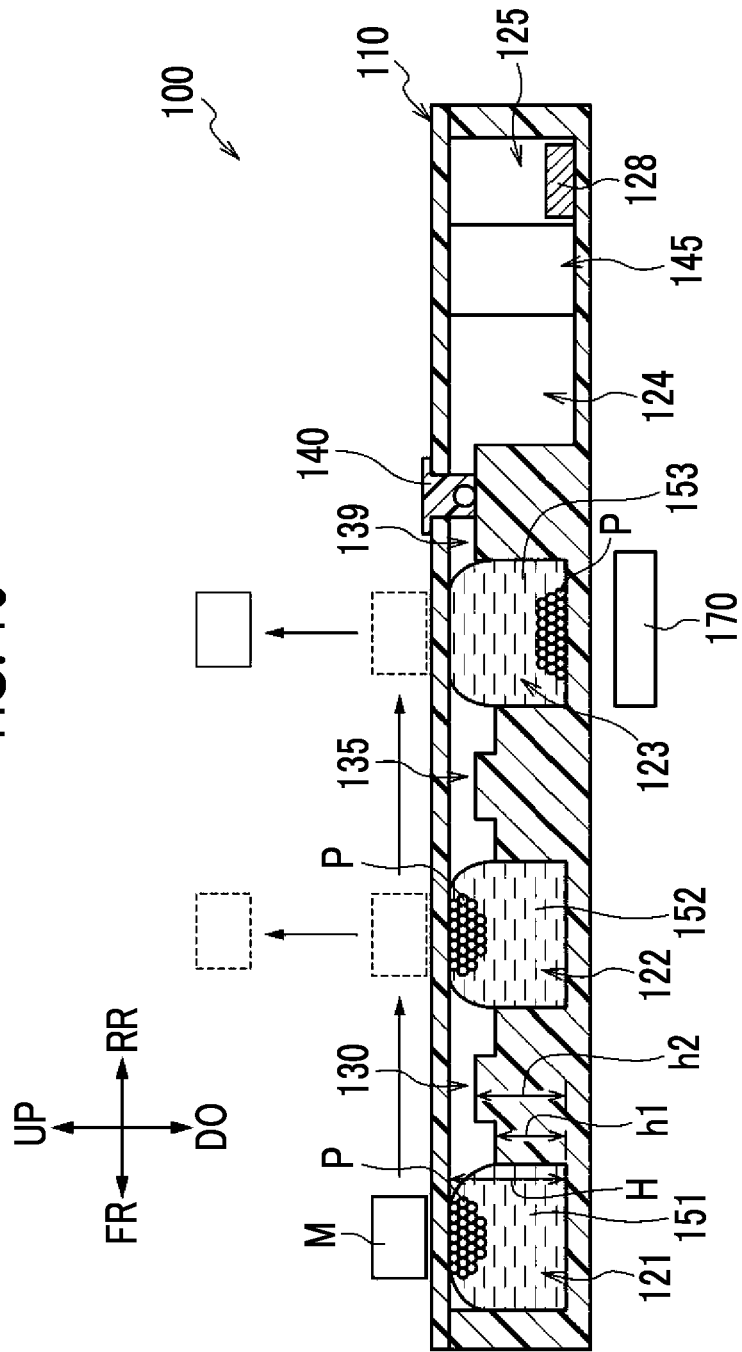
FIG. 10 is a cross-sectional view of the container 110 and a diagram showing a part of the nucleic acid extraction test apparatus 100.

The container according to the embodiment of the disclosed technology can be applied as, for example, a test container for a nucleic acid extraction test. FIG. 9 is a perspective view showing a part of a nucleic acid extraction test apparatus 100 including a container 110 according to a second embodiment of the disclosed technology. FIG. 10 shows a cross-sectional view of the container 110 and a part of the nucleic acid extraction test apparatus 100.

As shown in FIGS. 9 and 10, the nucleic acid extraction test apparatus 100 includes the container 110 according to the second embodiment, syringes 161 to 164 for adding various liquids 151 to 154 to respective accommodation parts 121 to 124 of the container 110, a magnetic field generation moving unit including a magnet M and a moving mechanism (not shown) for moving the magnet M, and a temperature control unit 170.

(Container 110)

The container 110 includes the four accommodation parts 121 to 124 respectively capable of accommodating liquids, a chromatographic carrier accommodation part 125 on which a chromatographic carrier 128 is installed, four flow passages 130, 135, 139, and 145, and a valve 140.

The container 110 includes a body part 112 constituting side wall surfaces and bottom surfaces of respective accommodation parts 121 to 125 and the flow passages 130, 135, 139, and 145, and the upper surface member 114 installed to cover openings of the accommodation parts 121 to 125 and the flow passages 130, 135, 139, and 145 of the body part 112 and constituting upper surfaces of the accommodation parts 121 to 125 and the flow passages 130, 135, 139, and 145. The upper surface member 114 is provided with injection ports 114a to 114d for injecting the liquid accommodated in the accommodation parts 121 to 124. Tips of syringes 161 to 164 are inserted into the injection ports 114a to 114d, respectively, and configured so that various liquids can be injected into the corresponding accommodation parts 121 to 124, respectively.

The accommodation part 121 is a magnetism collecting chamber (hereinafter, referred to as a magnetism collecting chamber 121) which accommodates a sample liquid 151 containing magnetic particles P to which a nucleic acid is adsorbed. The accommodation part 122 is a cleaning chamber (hereinafter, referred to as a cleaning chamber 122) which accommodates a cleaning liquid 152 and cleans a substance non-specifically adsorbed to the magnetic particles P. The accommodation part 123 is a PCR chamber (hereinafter, referred to as a PCR chamber 123) which accommodates a PCR solution 153. The accommodation part 124 is a test chamber (hereinafter, referred to as a test chamber 124) for mixing an amplified nucleic acid with a development liquid 154. The development liquid 154 is a form of a test pretreatment liquid.

The chromatographic carrier accommodation part 125 accommodates the chromatographic carrier 128. In the chromatographic carrier accommodation part 125, the development liquid 154 containing the amplified nucleic acid is developed. The chromatographic carrier 128 is a nucleic acid chromatographic carrier and indicates whether or not the target nucleic acid is present in the development liquid 154.

The flow passage 130 allows a magnetism collecting chamber 121 and the cleaning chamber 122 to communicate with each other at an upper end position. The magnetism collecting chamber 121, the cleaning chamber 122, and the flow passage 130 correspond to the first accommodation part, the second accommodation part, the flow passage in the disclosed technology, respectively. A relationship between the magnetism collecting chamber 121, the cleaning chamber 122, and the flow passage 130 is the same as a relationship between the first accommodation part 21, the second accommodation part 22, and the flow passage 30 in the container 10 of the first embodiment. That is, the flow passage 130 includes a first staircase part on the magnetism collecting chamber 121 side and includes a second staircase part on the cleaning chamber 122 side, to be configured to suppress the entry of a sample liquid 151 accommodated in the magnetism collecting chamber 121 to the flow passage 130 and to suppress the mixing of the sample liquid 151 with the cleaning liquid 152 accommodated in the cleaning chamber 122.

The flow passage 135 allows the cleaning chamber 122 and the PCR chamber 123 to communicate with each other at the upper end position. A relationship between the cleaning chamber 122, the PCR chamber 123, and the flow passage 135 also corresponds to the first accommodation part, the second accommodation part, and the flow passage in disclosed technology. A relationship between the cleaning chamber 122, the PCR chamber 123, and the flow passage 135 is the same as a relationship between the first accommodation part 21, the second accommodation part 22, and the flow passage 30 in the container 10 of the first embodiment. That is, the flow passage 135 includes a first staircase part on the cleaning chamber 122 side and a second staircase part on the PCR chamber 123 side, to be configured to suppress entry of the cleaning liquid 152 accommodated in the cleaning chamber 122 to the flow passage 135 and to suppress the mixing of the cleaning liquid 152 with the PCR solution 153 accommodated in the PCR chamber 123.

The flow passage 139 allows the PCR chamber 123 and the test chamber 124 to communicate with each other at the upper end position. The flow passage 139 is provided with the valve 140, and the flow of the PCR solution in the PCR chamber 123 into the test chamber 124 is controlled by opening and closing the valve 140. The valve 140 includes a rotatable flow passage part installed in the flow passage 139. In a case where the flow passage part is rotated in the flow passage 129 and the flow passage part is rotated in a direction parallel to the flow passage 139, the valve 140 is set as "open" and the flow of the liquid is allowed, and in a case where the flow passage part is rotated in a direction orthogonal to the flow passage 139, the valve is set as "closed" and the flow of the liquid is blocked.

The flow passage 145 allows the test chamber 124 and the chromatographic carrier accommodation part 125 to communicate with each other at a lower end position.

(Magnetic Field Generation Moving Unit)

The magnet M is the same as that described in the separation device 15. The moving mechanism for moving the magnet M allows the magnet M to pass the upper portion of the flow passage 130 from a position on the magnetism collecting chamber 121, to pass the upper portion of the flow passage 135 to a position on the cleaning chamber 122, and to move to a position on the PCR chamber 123. In addition, the moving mechanism moves the magnet M from the upper portion of the PCR chamber 123 to a position where the magnetic force does not reach the inside of the PCR chamber 123.

(Temperature Control Unit 170)

The temperature control unit 170 controls a temperature of the PCR solution in the PCR chamber 123. The temperature control unit 170 includes a heating unit such as a heater for heating a solution, and a cooling unit such as a Peltier element for cooling a solution. The temperature control unit 170 raises or lowers the temperature of the solution so that the temperature is adjusted to a suitable temperature in each step of a heat denaturation step, an annealing step, and an extension step in PCR.

(Nucleic Acid Extraction Test Method)

The steps of the nucleic acid extraction test in the nucleic acid extraction test apparatus 100 including the container 110 will be described.

—Pretreatment (Adsorption Step)—

A sample containing RNA is mixed with a solution containing a surfactant that dissolves a cell membrane and the magnetic particles P to adsorb the RNA to the magnetic particles P. The sample containing RNA is not particularly limited, as long as it contains the RNA such as a biological sample and virus.

As necessary, impurities may be removed with a filter or the like.

—Magnetization Collection Step—

The sample liquid 151 containing the magnetic particles P having RNA adsorbed, which was obtained in the pretreatment, is injected into the accommodation part 121 by the syringe 161. Next, the magnet M is set on the upper surface of the accommodation part 121. Accordingly, the magnetic particles P accommodated in the accommodation part 121 are attracted to the magnet M and are collected at a position corresponding to the magnet M on the upper surface to be in an aggregated state (see FIG. 10).

In the magnetism collecting chamber 121, an adsorption step and a magnetization collection step may be performed in time series.

Then, by moving the magnet M along the flow passage 130, the magnetic particles P are separated from the sample liquid 151 and moved to the cleaning chamber 122. The movement of the magnetic particles P is the same as that described in the above separation method. Since the flow passage 130 includes a first staircase part having two or more steps, the entry of the sample liquid 151 in the accommodation part 121 into the flow passage 130 during the movement of the magnetic particles P can be suppressed, and the magnetic particles P can be easily separated from the sample liquid 151 to move to the accommodation part 122.

—Cleaning Step—

In the cleaning chamber 122, the magnetic particles P adsorbed with RNA are cleaned with the cleaning liquid 152 accommodated in the cleaning chamber 122. The cleaning chamber 122 may be filled with the cleaning liquid 152 in advance, or the cleaning liquid 152 may be injected after the magnetic particles P are moved. The magnet M is moved to the position where the magnetic force does not affect the cleaning chamber 122 and the magnetic particles P are dispersed in the cleaning liquid 152, thereby promoting the cleaning. By performing the cleaning, the substances other than RNA that are non-specifically bonded to the magnetic particles P are removed. As the cleaning liquid 152, water or a buffer liquid, an organic solvent such as ethanol and isopropyl alcohol, or the like can be used. In a case where the buffer liquid is used as the cleaning liquid, salt is not particularly limited, but salt of tris or phosphoric acid is preferably used. In addition, in order to suppress the elution of RNA in the cleaning step, the surfactant such as sodium dodecyl sulfate, Triton X-100, or the like may be contained.

Then, by returning the magnet M to the upper portion of the cleaning chamber 122, the magnetic particles P are collected again at the position corresponding to the magnet M on the upper surface, and the magnet M is moved along the flow passage 135, thereby separating the magnetic particles P from the cleaning liquid 152 and moving the magnetic particles to the PCR chamber 123. The movement of the magnetic particles P is the same as that described in the above separation method. Also in this case, since the flow passage 135 includes a first staircase part having two or more steps, the entry of the cleaning liquid 152 in the cleaning chamber 122 into the flow passage 135 during the movement of the magnetic particles P can be suppressed, and the magnetic particles P can be easily separated from the cleaning liquid 152 to move to the PCR chamber 123.

—PCR Step—

In the PCR chamber 123, the RNA adsorbed to the magnetic particles P is eluted into the PCR solution 153, and the DNA amplification by PCR is performed. The PCR solution 153 contains, for example, reverse transcriptase, dNTP in which four kinds of deoxyribonucleotide triphosphates are mixed, and a primer for reverse transcriptase. Transcriptase is an enzyme that synthesizes complementary deoxyribonucleic acid (cDNA) using a base sequence of RNA as a template. The cDNA is synthesized from the extracted RNA and the cDNA is amplified by PCR.

After the PCR step, the valve 140 is "opened" to allow the solution containing the amplified cDNA to flow into the test chamber 124.

—Detection Step—

In the test chamber 124, the solution containing cDNA is mixed with the development liquid. After that, the mixed liquid passes through the flow passage 145 and is developed by the nucleic acid chromatographic carrier (chromatographic carrier 128) disposed in the chromatographic carrier accommodation part 125. In a case where the RNA to be tested is contained, a positive result is obtained, and in a case where not, a negative result is obtained.

The nucleic acid extraction test is performed as described above.

In addition, hereinabove, the case where the nucleic acid chromatography method is used as the detection method has been described above, but the detection method is not limited to the nucleic acid chromatography method, and well-known methods such as a fluorescence detection method (intercalator method, probe method, or the like), a light scattering method using gold nanoparticles, and a sequence method can be used. In these cases, the container does not necessarily include the chromatographic carrier 138 and the accommodation part 125 thereof. On the other hand, the test device may include a detection unit suitable for various detection methods of a fluorescence detection unit and the like for detecting fluorescence from the test chamber 124. However, the nucleic acid chromatography method is preferable because a high-priced detection system and detection equipment are not necessary and the operation in the analysis is simple.

By using the container 110, it is possible to suppress the mixing of the liquids between the magnetism collecting chamber 121 and the cleaning chamber 122, it is possible to suppress the mixing of the liquids between the cleaning chamber 122 and the PCR chamber 123, and it is possible to suppress impurities in the solution used in the previous step from being mixed in the solution in the next step, which leads to improvement in determination accuracy.

(Test Kit)

Figure 11:
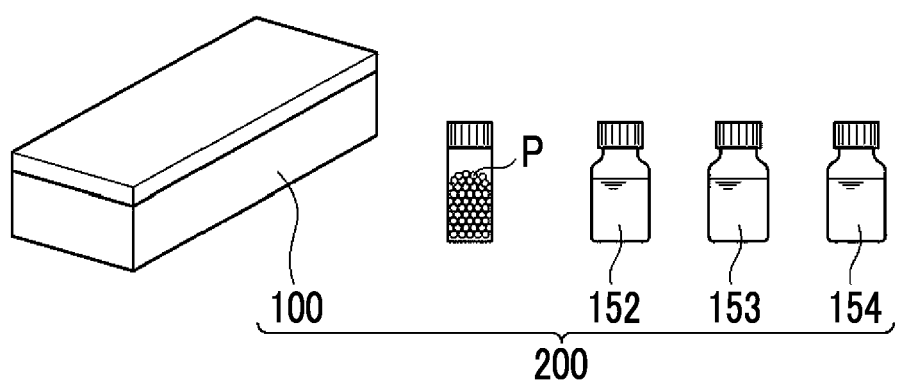
FIG. 11 is a diagram showing a schematic configuration of a test kit 200.

FIG. 11 shows a schematic configuration of a test kit 200 according to the embodiment. The test kit 200 includes the container 110, the magnetic particles P, and various treatment liquids such as the cleaning liquid 152, the PCR solution 153, and the development liquid 154. As described above, the container 110 can be provided as the test kit 200 together with the magnetic particles P, the cleaning liquid 152, the PCR solution 153, and the development liquid 154. The test kit 200 may further include other treatment liquid such as a nucleic acid eluate. In addition, as the test kit, it is also possible to provide a set of only the container 110 and the magnetic particles P. The magnetic particles P may be set in the accommodation part 121 of the container 110 in advance, or may be separately prepared.

The disclosed technology is not limited to the embodiment described above, and various modifications, changes, and improvements can be made without departing from the spirit of the disclosure. For example, the modification examples described above may be appropriately configured in combination.

EXAMPLES

Hereinafter, more specific examples and comparative examples of the disclosed technology will be described.

Examples and comparative examples of containers including two accommodation parts and flow passages connecting those to each other were prepared and evaluated.

Example 1

Figure 12:
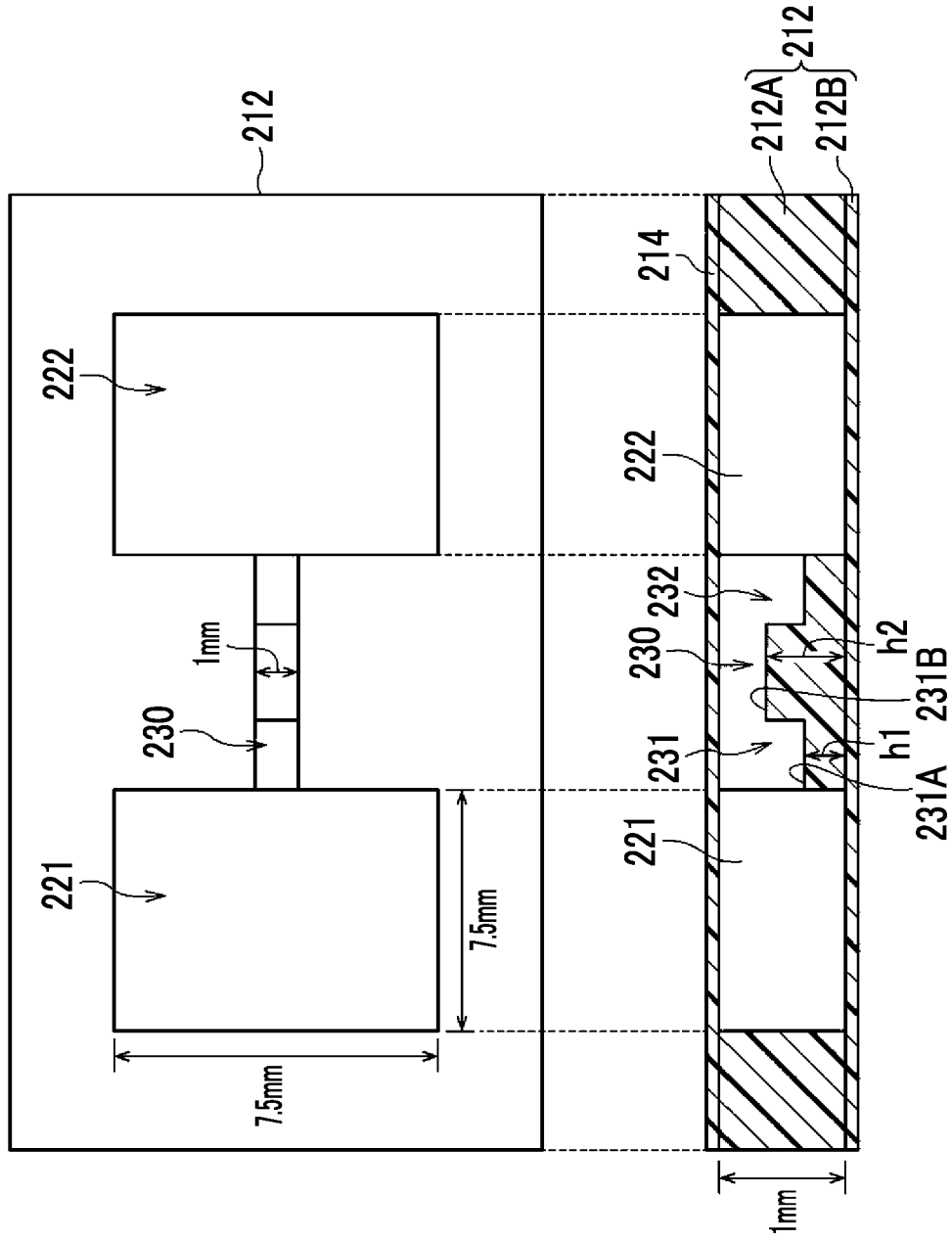
FIG. 12 shows a plan view of body part of the container and a cross-sectional view of the container of Example 1.

As Example 1, a container having the same shape as the container shown in FIGS. 2 to 4 was produced. FIG. 12 shows a plan view of body part of the container and a cross-sectional view of the container of Example 1.

A container 210 of Example 1 has a shape in which a first accommodation part 221 and a second accommodation part 222 are connected by one flow passage 230. The two accommodation parts 221 and 222 have the same shape, and have a length L of 7.5 mm, a width W of 7.5 mm, and a depth (height of accommodation part) H of 1 mm.

The flow passage 230 includes a first staircase part 231 on the first accommodation part 221 side and a second staircase part 232 on the second accommodation part 222 side. The first staircase part 231 and the second staircase part 232 have symmetrical shapes. That is, a height of each step of the second staircase part 232 is the same as a height of each step of the first staircase part 231. A height h1 of a first step 231A of the first staircase part 231 from a bottom surface of the first accommodation part 221 was set to 0.25 mm, and a height h2 of a second step 231B from the bottom surface of the first accommodation part 221 was set to 0.5 mm. A width of the flow passage 130 was set to 1 mm.

A body part 212 of the container 210 was formed of a main body part 212A constituting side wall surfaces of the first accommodation part 221, the second accommodation part 222, and the flow passage 230, and a bottom surface member 212B constituting bottom surfaces of the first accommodation part 221, the second accommodation part 222, and the flow passage 230.

Polycarbonate (PC) was used as the material of the container 210. Specifically, the main body part 212A was injection-molded using IUPILON EB-3001R manufactured by Mitsubishi Engineering Plastics Co., Ltd. As the bottom surface member 212B and the upper surface member 214, Technoloy C000 (thickness of 100 μm) manufactured by Sumika Acrylic Sales Co., Ltd. was used.

The upper surface member 214 and the bottom surface member 212B were roller-bonded to the upper surface and the bottom surface of the main body part 212A using the pressure sensitive adhesive #9969 manufactured by 3M Japan Ltd. to obtain the container 210 of Example 1.

Example 2

A container of Example 2 was obtained in the same manner as in Example 1, except that the height h2 of the second step 231B of the first staircase part 231 from the bottom surface of the first accommodation part 221 was set to 0.65 mm.

Example 3

A container of Example 3 was obtained in the same manner as in Example 1, except that the height h2 of the second step 231B of the first staircase part 231 from the bottom surface of the first accommodation part 221 was set to 0.8 mm.

Example 4

A container of Example 4 was obtained in the same manner as in Example 1, except that the height h1 of the first step 231A of the first staircase part 231 from the bottom surface of the first accommodation part 221 was set to 0.5 mm and the height h2 of the second step 231B from the bottom surface of the first accommodation part 221 was set to 0.8 mm.

Example 5

A container of Example 5 was obtained in the same manner as in Example 1, except that a third step is provided in the first staircase part 231 and a height h3 of the third step from the bottom surface of the first accommodation part 221 was set to 0.8 mm.

Example 6

A container of Example 6 was obtained in the same manner as in Example 1, except that the inner surface of the flow passage 230 was subjected to hydrophobic treatment. As the hydrophobic treatment of this example, Fluoro Technology Co., Ltd. (FS-1610) was applied with a brush and then dried at 70° C. for 1 minute (written as "fluorine" in Table). In other words, the water contact angle of the inner surface of the flow passage 230 was set to be greater than the water contact angles of the inner surfaces of the first accommodation part 221 and the second accommodation part 222.

Example 7

A container of Example 7 was obtained in the same manner as in Example 1, except that the inner surface of the flow passage 230 was subjected to hydrophobic treatment. The hydrophobic treatment of this example was performed as follows. A resin composition containing hydrophobic colloidal silica was applied to the inner surface of the flow passage 230 with a brush and then dried at 100° C. for 1 minute. Next, the resin composition was cured by irradiating it with light of a metal halide lamp (MAL625NAL manufactured by GS Yuasa International Ltd.) having an exposure intensity of 300 mJ/cm$^2$ in a low oxygen atmosphere having an oxygen concentration of 1,000 ppm or less, and a water-repellent resin layer was formed on the inner surface of the flow passage 230 (written as a "hydrophobic silica" in the table below). In other words, the water contact angle of the inner surface of the flow passage 230 was set to be greater than the water contact angles of the inner surfaces of the first accommodation part 221 and the second accommodation part 222.

The resin composition containing hydrophobic colloidal silica was obtained by mixing the following components.
—Resin Composition—
   1-Methoxy-2-propanol (manufactured by FUJIFILM Wako Pure Chemical Corporation): 6.24 g
   A-DPH (Shin Nakamura Chemical Co., Ltd., 1-methoxy-2-propanol 10% diluted liquid): 0.70 g
   Fluorine-based surfactant (MEGAFACE F-780F manufactured by DIC, MEK 2% diluted liquid): 0.24 g
   Hydrophobic Silica Dispersion Liquid: 2.61 g
   IRGACURE 127 (manufactured by BASF Japan Ltd., 1-methoxy-2-propanol diluted liquid 2%): 0.21 g The hydrophobic silica dispersion liquid contained in the resin composition described above was prepared by the following procedure.
   A hydrophobic silica dispersion liquid was obtained by mixing trimethylsilyl group-modified silica and 1-methoxy-2-propanol, and treating the mixture for 10 minutes while cooling with ice water using an ultrasonic homogenizer Sonifier 450 manufactured by Nippon Emerson Co., Ltd.

Here, the components of the hydrophobic silica dispersion liquid were as follows.
—Components of Hydrophobic Silica Dispersion Liquid—
   Trimethylsilyl group-modified silica (AEROSIL RX200 (fumed silica manufactured by Nippon Aerosil Co., Ltd.)): 1 g
   1-Methoxy-2-propanol (manufactured by FUJIFILM Wako Pure Chemical Corporation): 19 g Example 8

A container of Example 8 was obtained in the same manner as in Example 1, except that the inner surfaces of the accommodation parts 221 and 222 were subjected to hydrophilic treatment. As the hydrophilic treatment of this example, the corona treatment was performed on the inner surfaces of the accommodation parts 221 and 222 under the condition of 2,000 J/m$^2$. That is, by reducing the water contact angle of the accommodation parts 221 and 222, as a result, the water contact angle of the inner surface of the flow passage 230 was increased than the water contact angle of the inner surfaces of the accommodation parts 221 and 222.

Example 9

A container of Example 9 was obtained in the same manner as in Example 1, except that the inner surfaces of the accommodation parts 221 and 222 were subjected to hydrophilic treatment. In the hydrophilic treatment of this example, the hydrophilic film was installed only on portions corresponding to the upper surface and the inner bottom surface of the accommodation parts 221 and 222. As the hydrophilic film, a hydrophilic treatment film #9984 manufactured by 3M Japan Co., Ltd. was used. That is, by reducing the water contact angle of the accommodation parts 221 and 222, as a result, the water contact angle of the inner surface of the flow passage 230 was increased than the water contact angle of the inner surfaces of the accommodation parts 221 and 222.

Example 10

A container of Example 10 was obtained in the same manner as in Example 1, except that polypropylene (PP) was used as the material of the container 210. Specifically, the main body part 212A constituting the side wall surfaces of the accommodation parts and the flow passage is injection-molded using WINTEC WMG03UX manufactured by Japan Polypropylene Corporation, and for the bottom surface member 212B and the upper surface member 214, Trefan BO60-2500 (thickness 60 μm) manufactured by Toray Industries, Inc. was used.

Example 11

A container of Example 11 was obtained in the same manner as in Example 1, except that COP was used as the material of the container 210. Specifically, the main body part 212A constituting the side wall surfaces of the accommodation parts and the flow passage was injection-molded using ARTON F4520 manufactured by JSR Corporation, and a film having a thickness of 50 μm obtained by forming a film of ARTON R5000 manufactured by JSR Corporation was used as the bottom surface member 212B and the upper surface member 214.

Example 12

A container of Example 12 was obtained in the same manner as in Example 1, except that the height h2 of the second step 231B of the first staircase part 231 from the bottom surface of the first accommodation part 221 was set to 0.3 mm.

Example 13

A container of Example 13 was obtained in the same manner as in Example 1, except that the inner surface of the flow passage 230 was subjected to hydrophilic treatment. In this example, a corona treatment was performed as the hydrophilic treatment. That is, the water contact angle of the flow passage 230 was made smaller than the water contact angles of the accommodation parts 221 and 222.

Comparative Example 1

A container of Comparative Example 1 was obtained in the same manner as in Example 1, except that the first staircase part 231 of the flow passage 230 had only one step. In the container of Comparative Example 1, the height of the inner bottom surface of the flow passage from the inner bottom surface of the accommodation part corresponds to the height h1 of one step. In this example, h1 was set to 0.1 mm.

Comparative Example 2

A container of Comparative Example 2 was obtained in the same manner as in Comparative Example 1, except that h1 was set to 0.5 mm.

With respect to the containers of Examples 1 to 12 and Comparative Examples 1 and 2 obtained as described above, the water contact angles of the inner surfaces of the accommodation parts and the flow passage were measured.

(Water Contact Angle)

A fully automatic contact angle meter (model number: DM-701, Kyowa Interface Science Co., Ltd.) was used to measure the water contact angle. Under the condition of an atmosphere temperature of 25° C., 1 µL of pure water was added dropwise to the inner surfaces of the flow passage and the accommodation parts, a contact angle was measured by the θ/2 method, and an arithmetic mean value of the values obtained by performing the measurement five times was used as a value of the contact angle. The water contact angles of the accommodation parts and the flow passage of the container of each example and the difference therebetween (water contact angle of the flow passage—water contact angle of the accommodation part) are shown in Table 1.

The liquid sealing property of the containers of Examples 1 to 13 and Comparative Examples 1 and 2 was evaluated by the following method.

(Evaluation of Liquid Sealing Property)

Figure 13:
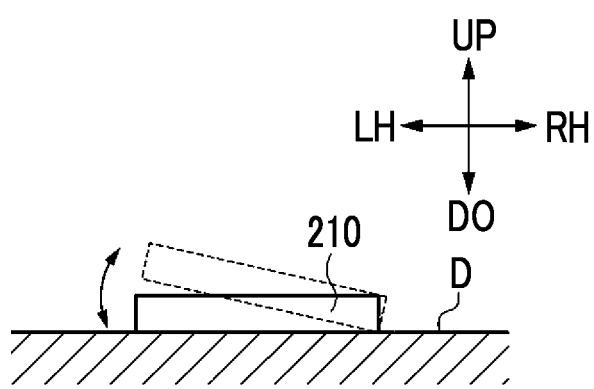
FIG. 13 is a diagram for explaining a method for evaluating liquid sealing properties of Examples and Comparative Examples.

After adding 50 µL of water to the first accommodation part, vibration was applied into the flow passage by moving one side of the container up and down. As shown in FIG. 13, in a state where one side of a lower surface of the container 210 in a width direction (one side of a lower surface on an RH side in FIG. 13) is in contact with a desk D, the other side parallel to one side is lifted up from the desk D and horizontally moved as shown with an arrow in the drawing. After repeating this 30 times and applying vibration, the water in the first accommodation part was recovered with a pipette and weighed, and a recovery rate with respect to an initially added amount was calculated. The recovery rate was evaluated according to the following criteria. For practical use, E or higher is required. In addition, practically, D or higher is preferable, C or higher is more preferable, and B or higher is further preferable.

A: 97.5% or more
B: 95% or more and less than 97.5%
C: 90% or more and less than 95%
D: 80% or more and less than 90%
E: 70% or more and less than 80%
F: less than 70%

Table 1 collectively shows the container configuration, the measurement, and the evaluation result of each example.

TABLE 1

| | | Accommodation part Surface treatment | Flow passage Step 1 Height h1 [mm] | Flow passage Step 1 Surface treatment | Flow passage Step 2 Height h2 [mm] | Flow passage Step 2 Surface treatment | Flow passage Step 3 Height h3 [mm] | Flow passage Step 3 Surface treatment | Water contact angle (°) Accommodation part | Water contact angle (°) Flow passage | Water contact angle (°) Difference | Evaluation Liquid sealing property |
|---|---|---|---|---|---|---|---|---|---|---|---|---|
| | Material | | | | | | | | | | | |
| Example 1 | PC | — | 0.25 | — | 0.5 | — | — | — | 87 | 87 | 0 | D |
| Example 2 | PC | — | 0.25 | — | 0.65 | — | — | — | 87 | 87 | 0 | C |
| Example 3 | PC | — | 0.25 | — | 0.8 | — | — | — | 87 | 87 | 0 | B |
| Example 4 | PC | — | 0.5 | — | 0.8 | — | — | — | 87 | 87 | 0 | A |
| Example 5 | PC | — | 0.25 | — | 0.5 | — | 0.8 | — | 87 | 87 | 0 | B |
| Example 6 | PC | — | 0.25 | Fluorine | 0.5 | Fluorine | — | — | 87 | 105 | 18 | B |
| Example 7 | PC | — | 0.25 | Hydrophobic silica | 0.5 | Hydrophobic silica | — | — | 87 | 151 | 64 | A |
| Example 8 | PC | Corona treatment | 0.25 | — | 0.5 | — | — | — | 45 | 87 | 42 | B |
| Example 9 | PC | Hydrophilic sheet | 0.25 | — | 0.5 | — | — | — | 17 | 87 | 70 | A |
| Example 10 | PP | — | 0.25 | — | 0.5 | — | — | — | 97 | 97 | 0 | C |
| Example 11 | COP | — | 0.25 | — | 0.5 | — | — | — | 92 | 92 | 0 | C |
| Example 12 | PC | — | 0.25 | — | 0.3 | — | — | — | 87 | 87 | 0 | E |
| Example 13 | PC | — | 0.25 | Corona treatment | 0.5 | Corona treatment | — | — | | | | |
| Comparative Example 1 | PC | — | 0.1 | — | — | — | — | — | | | | |
| Comparative Example 2 | PC | — | 0.5 | — | — | — | — | — | | | | |

TABLE 1-continued

| | | | | | | |
|---|---|---|---|---|---|---|
| Example 13 | — | — | 87 | 45 | −42 | E |
| Comparative Example 1 | — | — | 87 | 87 | 0 | F |
| Comparative Example 2 | — | — | 87 | 87 | 0 | F |

As shown in Table 1, in Comparative Examples 1 and 2 in which the first staircase part has only one step with respect to the inner bottom surface of the accommodation part, the liquid sealing property was not sufficient. On the other hand, in Examples 1 to 13 in which the first staircase part includes two or more steps, the liquid sealing property could be improved, compared to the comparative examples.

In Examples 1 to 3 and 12, the height of the second step is different, and the higher the height of the second step, the higher the liquid sealing property. It is considered that, compared to a case where the height of the second step is 30% of the height of the container as in Example 12, the height of the second step is preferably 50% or more of the height of the container.

As in Example 4, the height of the first step was increased, compared to Example 3 to 50% of the height of the accommodation part, and accordingly, a significantly preferable liquid sealing property was obtained. As in Example 5, by providing three steps, the liquid sealing property was improved, compared to Example 1 having two steps.

As in Examples 6 to 9, it is clear that, even in a case of the container having the same shape as in Example 1, by increasing the water contact angle of the inner surface of the flow passage than the water contact angle of the inner surface of the accommodation part, the liquid sealing property is further increased. In Examples 7 and 9 in which the difference in water contact angle between the flow passage and the accommodation part exceeds 50°, the particularly preferable liquid sealing property was obtained. The containers of Examples 10 and 11 have materials different from that in Example 1, and the water contact angle of the inner surface of the container is greater than that in Example 1. It is considered that, the water contact angle of the inner surface of the accommodation part and the inner surface of the flow passage is the same, but the larger the water contact angle of the inner surface of the container, the higher the liquid sealing property.

EXPLANATION OF REFERENCES 10, 10A, 10B, 110, 210: container
12, 12A: body part
14: upper surface member
15: Separation device
21, 221: first accommodation part
21a: inner bottom surface of first accommodation part
21b: upper surface of first accommodation part
21c to 21f: side wall surface of first accommodation part
22, 222: second accommodation part
22a: inner bottom surface of second accommodation part
22b: upper surface of second accommodation part
22c to 21f: side wall surface of second accommodation part
30, 130, 135, 139, 145, and 230: flow passage
30a: inner bottom surface of flow passage
30b: upper surface of flow passage
30c to 30f: side wall surface of flow passage
31: first staircase part
31A, 31B: step of first staircase part
32: second staircase part
32A, 32B step of second staircase part
100: nucleic acid extraction test apparatus
112 body part of container
114: upper surface member of container
114a: injection port
121: magnetism collecting chamber (accommodation part)
122: cleaning chamber (accommodation part)
123: PCR chamber (accommodation part)
124: test chamber (accommodation part)
125: chromatographic carrier accommodation part
128: chromatographic carrier
140: valve
151: sample liquid
152: cleaning liquid
153: PCR solution
154: development liquid
161 to 164: syringe
170: temperature control unit
200: test kit
212: main body part
212A: main body part
212B: bottom surface member
214: upper surface member
231, 232: staircase part
231A, 231B: step of staircase part
L: liquid
P: magnetic particles

What is claimed is:

1. A container comprising:
a first accommodation part which accommodates a first liquid containing magnetic particles, the first accommodation part being a chamber containing the first liquid;
a second accommodation part which accommodates separated magnetic particles separated from the first liquid, and a second liquid different from the first liquid, the second accommodation part being a chamber containing the second liquid, wherein the second liquid does not include a liquid extracted or separated from the first liquid; and
a flow passage which allows the first accommodation part and the second accommodation part to communicate with each other, and through which the separated magnetic particles pass,
wherein the flow passage has a first staircase part including two or more steps from an inner bottom surface of the first accommodation part on a first accommodation part side, the first staircase part being a barrier for suppressing entry of the first liquid into the flow passage,
wherein a height of the flow passage is smaller than a height of the first accommodation part and a height of the second accommodation part, wherein a width of the flow passage is narrower than a width of the first accommodation part and a width of the second accommodation part, and
wherein a water contact angle of at least a part of an inner surface of the first accommodation part is smaller than a water contact angle of at least a part of an inner surface of the flow passage.

2. The container according to claim 1,
wherein the flow passage allows the first accommodation part and the second accommodation part to communicate with each other at upper end positions thereof.

3. The container according to claim 1,
wherein a height of a first step of the first staircase part with respect to the inner bottom surface of the first accommodation part is 25% to 80% of a height of the first accommodation part.

4. The container according to claim 2,
wherein a height of a first step of the first staircase part with respect to the inner bottom surface of the first accommodation part is 25% to 80% of a height of the first accommodation part.

5. The container according to claim 1,
wherein a height of a second step of the first staircase part with respect to the inner bottom surface of the first accommodation part is 50% to 96% of a height of the first accommodation part.

6. The container according to claim 2,
wherein a height of a second step of the first staircase part with respect to the inner bottom surface of the first accommodation part is 50% to 96% of a height of the first accommodation part.

7. The container according to claim 3,
wherein a height of a second step of the first staircase part with respect to the inner bottom surface of the first accommodation part is 50% to 96% of a height of the first accommodation part.

8. The container according to claim 4,
wherein a height of a second step of the first staircase part with respect to the inner bottom surface of the first accommodation part is 50% to 96% of a height of the first accommodation part.

9. The container according to claim 1,
wherein the water contact angle of at least a part of the inner surface of the flow passage is 90° to 180°.

10. The container according to claim 1,
wherein the water contact angle of at least a part of the inner surface of the flow passage is 120° to 180°.

11. The container according to claim 1,
wherein the water contact angle of at least a part of the inner surface of the first accommodation part is 0° to 60°.

12. The container according to claim 1,
wherein the water contact angle of at least a part of the inner surface of the first accommodation part is 0° to 30°.

13. The container according to claim 1,
wherein an angle of at least one step of the first staircase part is an acute angle in a cross section parallel to an extending direction of the flow passage and parallel to a direction perpendicular to the flow passage.

14. The container according to claim 1,
wherein the flow passage has a second staircase part including two or more steps from an inner bottom surface of the second accommodation part on a second accommodation part side.

15. The container according to claim 1,
wherein the magnetic particles are magnetic particles that adsorb nucleic acid.

16. The container according to claim 15, further comprising:
a chromatographic carrier for performing a test of the nucleic acid; and
a carrier accommodation part for accommodating the chromatographic carrier.

17. A test kit comprising:
the container according to claim 1; and
magnetic particles.

18. The test kit according to claim 17, further comprising:
a nucleic acid extraction liquid, a cleaning liquid, and at least one solution of an amplification liquid or a detection pretreatment liquid.

* * * * *